United States Patent [19]

Nakamura

[11] 4,096,075

[45] Jun. 20, 1978

[54] SELF-LUBRICATED SOLID MATERIALS

[75] Inventor: Hajime Nakamura, Fuchu, Japan

[73] Assignee: Sankyo Oilless Industries, Inc., Tokyo, Japan

[21] Appl. No.: 743,004

[22] Filed: Nov. 18, 1976

[51] Int. Cl.$^2$ .......................... C10M 5/00; C10M 7/00
[52] U.S. Cl. ...................................... 252/12.2; 252/12
[58] Field of Search ...................... 252/12, 12.2, 12.4, 252/12.6

[56] References Cited

U.S. PATENT DOCUMENTS

| | | | |
|---|---|---|---|
| 1,430,560 | 10/1922 | Kempton | 252/12 |
| 2,151,972 | 3/1939 | Howlett | 252/12 |
| 2,691,814 | 10/1954 | Tait | 252/12 |
| 2,995,462 | 8/1961 | Mitchell et al. | 252/12 |
| 3,383,144 | 5/1968 | Zapponi | 252/12 |
| 3,464,845 | 9/1965 | Osborn et al. | 252/12 |
| 3,540,862 | 9/1965 | Rolmer | 252/12 |
| 3,613,202 | 10/1971 | Soder | 252/12.2 |
| 3,678,145 | 7/1972 | Boes | 252/12 |
| 3,883,314 | 5/1975 | Schnyder et al. | 252/12.2 |
| 3,941,903 | 3/1976 | Tucker | 252/12 |

*Primary Examiner*—Delbert E. Gantz
*Assistant Examiner*—Irving Vaughn
*Attorney, Agent, or Firm*—Jay L. Chaskin

[57] ABSTRACT

A self-lubricated solid material comprising a metallic matrix having a lubricated surface, a plurality of circular cavities provided in the lubricating surface of the metallic matrix, a solid lubricant embedded in each of the circular cavities, and the circular cavities being disposed in the relation of $R < P < R/\cos\theta$, when $0° < \theta \leq 45°$, and $R < P < R/\sin\theta$, when $45° \leq \theta < 90°$ where $R$ is the diameter of each of the circular cavities, $P$ is the distance between the centers of adjacent two circular cavities and $\theta$ is the angle defined between a predetermined direction and the line lying on the centers of the two circular cavities.

1 Claim, 3 Drawing Figures

SELF-LUBRICATED SOLID MATERIALS

BACKGROUND OF THE INVENTION

This invention relates to a self-lubricated solid material provided with a solid lubricant embedded in a sliding surface of a matrix, and particularly to a self-lubricated solid material effective in sliding movements in one direction as well as in another direction normal thereto.

Self-lubricated solid materials have hitherto been provided with a solid lubricant, such as graphite or molybdenum disulfide, embedded in lubricating surfaces (sliding surfaces) of metallic materials of various kinds of bearing metals. Lubricating film of a solid lubricant, such as graphite, is different from that of a liquid lubricant, such as lube oil, in that it has no fluidity so that once the film has been worn and broken out the film can not be self-recovered, and it has, therefore, been accomplished that the lubricating film should not be worn and broken out for a long time. In conventional self-lubricated solid materials of this kind, however, there has not been provided a good lubricity in either of one direction and another direction normal thereto.

SUMMARY OF THE INVENTION

An object of the present invention is to provide a self-lubricated solid material including a solid lubricant embedded in a surface of a metallic matrix to provide a good lubricity in either of one direction and another direction normal thereto.

Another object of the present invention is to provide a self-lubricated solid material including a solid lubricant embedded in circular cavities, formed in a surface of a metallic matrix, which are arranged in order to lubricity in such a manner that the low fluidity of the solid lubricant can be compensated and the lubricating film of the solid lubricant is hardly broken out to permit lubrication in one direction as well as in another direction normal thereto.

Further and other objects and merits of the present invention will easily be understood from the detailed description of the preferred embodiment by way of the accompanying drawings.

DETAILED DESCRIPTION OF THE INVENTION

According to the present invention, it is preferable that the cavities formed in a surface of a metallic matrix for embedding solid lubricant are formed into a circular shape in view of the facts that the strength of the metallic matrix is not extremely lowered, that the directional dependency of the lubricity is reduced and that the manufacture can easily be made. The circular cavities are formed in a plural number in the lubricated surface of the metallic matrix, and it is preferable that the proportion of the total area of the circular cavities occupying in the metallic matrix surface defining the lubricated surface is 25 - 30%. In this case, it is also desirable to provide an increased number of circular cavities each having a relatively small area, thereby not extremely lowering the strength of the metallic matrix made of one of various bearing materials. A solid lubricant comprising graphite, molybdenum disulfide, polytetrafluoroethylene or their mixture, is embedded in each of such circular cavities, and as a result the proportion of the total area of the solid lubricant occupying in the lubricated surface of the metallic matrix of the self-lubricated solid material of the present invention is about 25 - 30%.

It is necessary that the circular cavities in each of which the solid lubricant is embedded are disposed in such a manner that some of the circular cavities are at least partially laid in a direction of movement of the moving member to be lubricated. In order to provide the lubricity in either of one direction and another direction normal thereto, therefore, it is necessary that some of the spaced circular cavities are at least partially laid in both of the above two directions. Namely, it is essential that adjacent two circular cavities are in relative position in which they are laid in two directions normal to each other.

Figure 1:
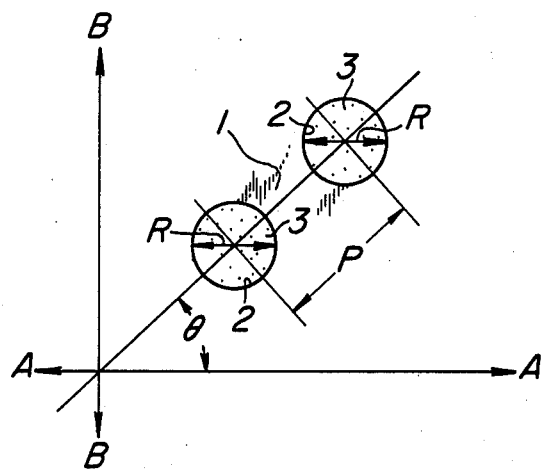
FIG. 1 shows a relative disposition of two adjacent circular cavities of a plurality of circular cavities formed in a surface of a metallic matrix of a self-lubricated solid material.
Figure 2:
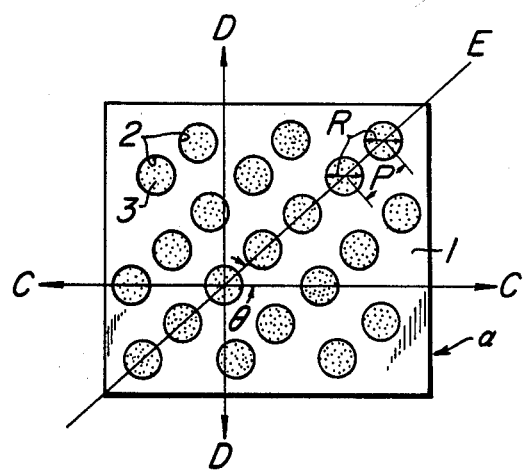
FIG. 2 is a plan view of a self-lubricated solid material according to the present invention.

In FIGS. 1 and 2, 1 is a metallic matrix and 2 is circular cavities formed in a lubricated surface of the metallic matrix and 3 is a solid lubricant embedded in each of the circular cavities such that the free surface of the solid lubricant coincides with the lubricated surface of the martix. When it is defined that $P$ is the distance between the centers of adjacent circular cavities, $R$ being the diameter of each of the cavities, $\theta$ being the angle between the line passing through the centers of the cavities and a predetermined direction A, and B being the direction normal to the direction A, the condition that the two adjacent circular cavities are at least partially laid in both of the directions A and B is:

$$P \sin \theta < R$$
$$P \cos \theta < R \tag{1}$$

However, when $0° < \theta \leq 45°$, $\sin \theta \leq \cos \theta$, and when $45° \leq \theta < 90°$, $\cos \theta \leq \sin \theta$. Thus, the expression (1) may be replaced by $$P < R/\cos \theta, \text{ when } 0° < \theta \leq 45°,$$
$$P < R/\sin \theta, \text{ when } 45° \leq \theta < 90°. \tag{2}$$

On the other hand, when the distance $P$ between the centers of the two adjacent circular cavities becomes small, the cavities become contacted with each other to extremely lower the surface strength of the matrix and thus there is required the condition in which the two adjacent circular cavities are not contacted with each other, namely $$R < P \tag{3}$$

Therefore, the condition in which the two adjacent circular cavities are at least partially laid in both the directions $A$ and $B$ and are not contacted with each other should satisfy the expressions (2) and (3). Namely, when $0° < \theta \leq 45°$, $R < P < R/\cos \theta$ and when $45° \leq \theta < 90°$, $R < P < R/\sin \theta$, \quad (4)

provided that $\theta \neq 0°$ and $\theta \neq 90°$.

FIG. 2 shows an embodiment of the present invention in which the self-lubricated solid material α comprises a matrix 1 made of an alloy of aluminum bronze, a plurality of spaced circular cavities 2 each having a diameter of 10 mm, and a solid lubricant 3 including graphite, molybdenum disulfide or polytetrafloroethylene and embedded in each of the circular cavities. The sliding movements of the member moving on the self-lubricated solid material are in directions C — C and D — D, and the angle $\theta$ taken between the line passing through the centers of the nearest two circular cavities and the direction C — C being 42°, the diameter R of each of the circular cavities being 10 mm, the distance P between their centers being 13 mm, so that the expression (4) is satisfied. The self-lubricated solid material α has dimensions of 80 mm and 72 mm in the directions C — C and D — D, respectively, and provided with twenty one circular cavities each of which the solid lubricant is embedded. In this case, the proportion of the total area of the solid lubricant occupying in the lubricated surface is about 28.6%.

A sliding test of the moving member made of gray cast iron FC-25 on this self-lubricated solid material α was made under the condition that the load weight thereto was 200 kg/cm² and the speed of sliding movement was 5 m/min. In this test, after sliding movement has been made 180,000 times, the coefficient of friction of the self-lubricated solid material α in either of the two directions was not varied and the lubricity was good.

Figure 3:
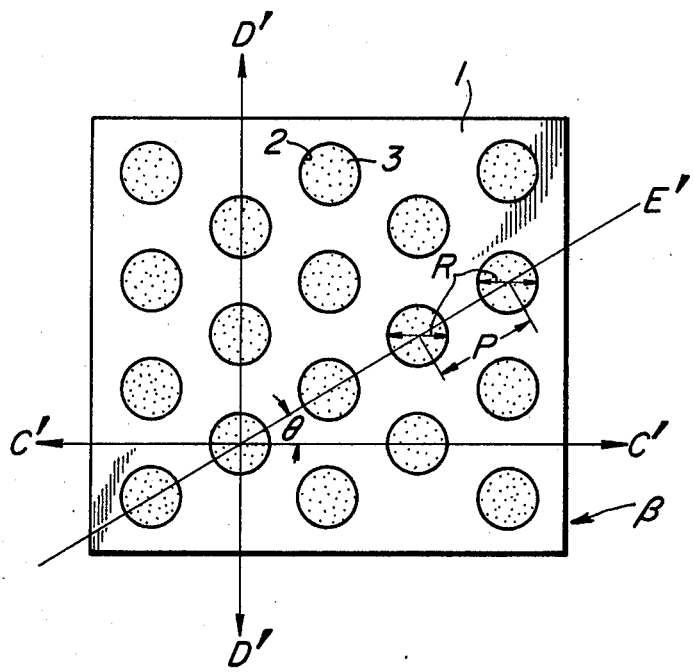
FIG. 3 is a plan view of a self-lubricated solid material having circular cavities not disposed in the condition of the present invention.

FIG. 3 shows an example of a self-lubricated solid material which does not satisfy the requirement of disposition of the circular cavities given by the expression (4). In this figure, the sliding directions of the moving member are shown by lines C' — C' and D' — D'. The angle $\theta$ defined by the line C' — C' and the line lying on the centers of circular cavities which are in the nearest position with respect to each other is 30°, the diameter R of each of the circular cavities being 10 mm and the distance P between the centers of the cavities being 17 mm. In this case, the unequal relation of the left-side of the expression (4) is satisfied, but the unequal relation of the right-side thereof is not satisfied. The self-lubricated solid material β having such disposition of the circular cavities is shaped to have a length of 80 mm in the direction C' — C' and a length of 72 mm in the direction D' — D', as in the embodiment shown in FIG. 2. There are provided eighteen circular cavities having the solid lubricant, and the proportion of the total area of the solid lubricant occupying in the lubricating surface is 25%.

The sliding test of the self-lubricated solid material α was made under the same condition as in the embodiment of the present invention shown in FIG. 2. In this test, a good result similar to that of the self-lubricated solid material α shown in FIG. 2 was obtained with respect to the sliding movement in the direction C' — C', but in case of the sliding movement in the direction D' — D', only when the sliding movements have been repeated 259 times, the smearing was caused on the sliding surface and the coefficient of friction was abruptly increased.

By those tests, it is proved that the disposition of the solid lubricant according to the present invention can provide a self-lubricated solid material maintaining a good lubricity for a long time in the directions normal to each other.

What is claimed is:

1. A self-lubricated solid material comprising:
a metallic matrix having a lubricated surface;
a plurality of circular cavities provided in the lubricating surface of said matrix;
a solid lubricant embedded in each of said circular cavities such that the free surface of said solid lubricant coincides with the lubricating surface of said matrix;
said circular cavities being disposed in the relation of $R < P < R/\cos \theta$, when $0° < \theta \leq 45°$, and $R < P < R/\sin \theta$, when $45° \leq \theta < 90°$ where $P$ is the distance between the centers of adjacent two circular cavities, $R$ is the diameter of each of the circular cavities and $\theta$ is the angle defined between a predetermined direction and the line lying on the centers of the two circular cavities; and
the arrangement being such that the lubricity can be maintained for a long time in said predetermined direction as well as in a direction normal thereto.

* * * * *